Patented Dec. 5, 1922.

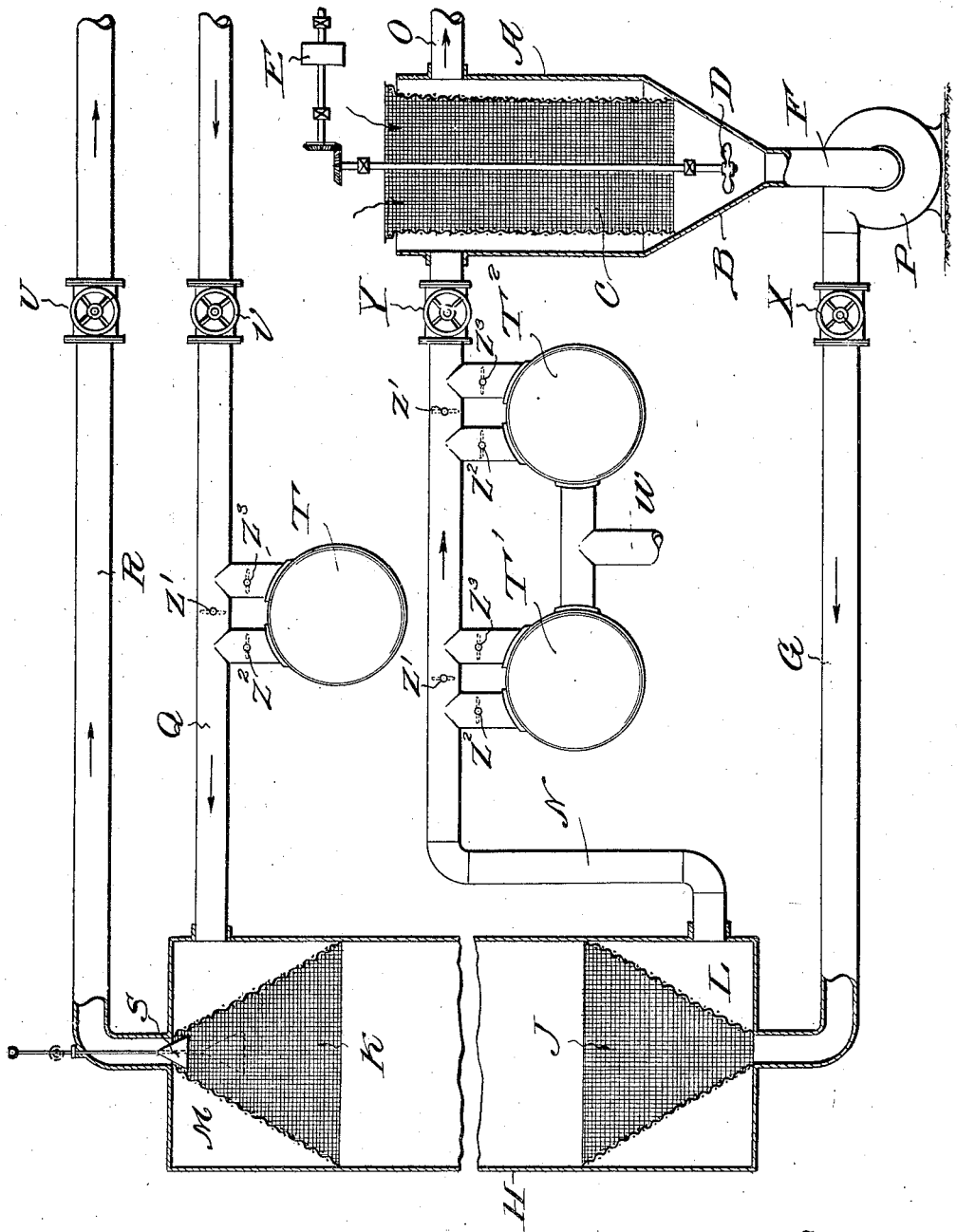

1,437,801

UNITED STATES PATENT OFFICE.

WALTON C. GRAHAM, OF DENVER, COLORADO.

PROCESS OF EXTRACTING SOLUBLE MATTERS FROM SHREDDED OR FINELY-DIVIDED MATERIALS.

Application filed December 2, 1918. Serial No. 264,974.

*To all whom it may concern:*

Be it known that I, WALTON C. GRAHAM, a citizen of the United States, residing at Denver, in the county of Denver and State of Colorado, have invented new and useful Improvements in Processes of Extracting Soluble Matters from Shredded or Finely-Divided Materials, of which the following is a specification.

This invention relates to the art of treating solids with liquids and particularly to a method for extracting soluble matters from masses of shredded or finely divided materials. The invention has special utility when employed in the extraction of saccharine matter from finely divided sugar beets or cossettes, but is by no means limited to such use.

In the art of extracting soluble matter from materials, and especially in the beet sugar industry, it is, as is well known, of the utmost importance to keep the juices as concentrated as possible, so as to reduce to a minimum the volume of liquid to be evaporated. With this in mind, I have devised a process of and means for confining the material to be treated in a compact mass, and for continuously treating the same under high pressure.

The invention accordingly comprises a continuous method of the kind described in which the material is carried along by a stream of liquid, and at the same time, is acted upon by a stream moving generally in the opposite direction, the material being held in such a way as to be brought into intimate and uniform contact, under pressure, with the treating liquid, and prevented from packing. The invention provides for the use of improved apparatus for carrying out the above process, in which the rate of flow, temperature, pressure, degree of exhaustion, extent of concentration, etc., can be readily controlled, and in which the results can be accomplished with a minimum of labor. My improved apparatus is moreover, exceptionally compact, simple in construction and operation, and of comparatively low first cost.

In order that the invention may be readily understood reference is had to the accompanying drawing, forming part of this specification and which illustrates more or less diagrammatically the apparatus constructed and arranged to conduct the process of the invention.

Referring to the drawing in detail, A designates a hopper into which the sliced beets or cossettes are fed. This hopper has a conical bottom B and a lining C of woven wire or the like, spaced from the walls of the hopper as shown. A stirrer D is arranged near the bottom of the hopper and is mounted on a vertical shaft driven by suitable gearing from a belt pulley or the like E.

From the bottom of the hopper extends a conduit F to the intake side of the centrifugal or other pump P and from the discharge side of this pump extends a pipe or conduit G to the treating chamber H. This chamber is preferably cylindrical and is of comparatively great length or height relative to its diameter. The chamber is arranged vertically and the pipe G communicates with the bottom thereof. Inside of the chamber H at the top and bottom thereof are cone shaped foraminous partitions J and K respectively; the large ends of these cone shaped partitions facing toward the middle of the chamber. Spaces L and M respectively are formed below and above the foraminous partitions J and K as shown. From the space L extends a pipe or conduit N back to the hopper A with which it communicates near its upper end. A discharge pipe O also extends from the hopper A at substantially the same level as the pipe N.

A pipe Q communicates with the upper space M of the treating chamber and is controlled by means of a valve V.

Extending upwardly from the center of the chamber H and partition K is a discharge pipe R controlled by a valve U. The mouth of this pipe may also be controlled by means of an adjustable bell S, as shown in the drawing.

Suitable heating means T is interposed in the pipe Q and other heating means $T^1$ and $T^2$ are interposed in the pipe N, a heating medium such as steam being supplied to the heaters by means of a pipe W, and pivoted valves, or the like, $Z^1$, $Z^2$ and $Z^3$ being employed to govern the flow of liquid through each of said heaters. By this means any or all of the heaters may be used, as desired, and the temperature of the liquids thus controlled. Valves X and Y are interposed in the pipes G and N respectively for controlling the flow of material therethrough.

To start the apparatus in operation, the hopper A is first filled to the overflow point O, either with fresh or saturated solvent, and the valves X and Y being open, the treating chamber H will likewise be filled with the said solvent to a height determined by the position of the overflow O, as will also the connecting lines G and N and the heaters $T^1$—$T^2$.

The finely divided material from which the soluble matter is to be extracted is now introduced into the top of the hopper A, and within the screen enclosure C, the pump and stirrer are started and the mixture of liquid and solids is forced through the pipe G into the lower portion of the chamber H. Here the solid material collects above the screen, while the liquid passes through the screen into the space L and back by means of the pipe N, through the heaters to the hopper A. This is accomplished by gravity, as the introduction of the additional liquid carrying the solids displaces an equal amount of that within the chamber H.

This operation is continued until the entire interior space in the chamber H between the screen or partitions J and K is filled with the compact mass of material to be treated, such material being compressed against the upper partition by the action of the pump P, and the liquid meanwhile being continuously returned to the hopper A.

After the chamber H is filled, as described, the valves X and Y are temporarily closed, and the pump stopped.

Fresh solvent of treating liquid, such as water, which has been heated by passage through the heater T is now admitted through the pipe Q by opening the valve V. This solvent enters the space M, where it percolates downward through the small interstitial spaces of the compact mass of material; the displaced air rises as the space is occupied by the liquid and passes out at the top through the pipe R, until finally the interstitial spaces within the chamber H are completely filled with the liquid.

Next the valve Y is opened, and a flow of liquid takes place from the top of the chamber to the bottom, and by means of the pipe N into the hopper A, which being full, will cause the overflow of an equal amount of liquid through the pipe O. This flow of solvent through the chamber H should be continued until the soluble matter in the material adjacent to the upper conical screen K is exhausted to the desired extent.

The initial step of charging the chamber H and exhausting the upper layers of material having been accomplished, the system is in readiness to begin the continuous operation. To do this, the introduction of the finely divided material to be treated into the hopper A is resumed, and carried on uninterruptedly, the valve X is opened and the pump and stirrer set in motion with the result that, valve Y being also open, further amounts of a mixture of liquids and solids are continuously passed into the bottom of the treating chamber H, where the solids are retained above the screen as before, and the liquid returns by gravity through the pipe N by way of the heaters to the hopper A. Each increment of solids obviously displaces a corresponding quantity of the exhausted material or pulp at the top of the chamber H, which is forced through partly open bell S and the pipe R and out of the apparatus, the valve U being open.

The introduction of fresh hot solvent through pipe Q is continued, and this progressively displaces the charged solvent, which escapes through pipe N, and eventually overflows at O.

The dissolving of the soluble matters is accomplished by the passage of the liquid introduced through the pipe Q, and at the same time, the exhausted material is discharged through the pipe R.

The solvent in its downward path comes in contact with material carrying increasingly greater amounts of soluble matter, while the solids in passing upward come in contact with solvent of continually decreased content of solubles, the effect of the procedure being to exhaust the solids of soluble matter and at the same time obtain the greatest concentration of such soluble matter in the solvent.

As the well saturated solvent passes out of the chamber H through the foraminous partition J by the line N, through the heater $T^1$—$T^2$, it comes finally in contact with the absolutely fresh material to be treated in the hopper A, and its interior screened enclosure C, where by reason of its increased temperature and the greater content of soluble matter in the fresh material, a further extraction of such soluble matter takes place to the utmost possible extent.

In practice the relative amounts of solvent, and solids to be treated will be maintained in the hopper in such a proportion that the fresh material dropping into the hopper will be immediately heated to the degree which is considered necessary for proper sterilization.

The forces of diffusion will have reached very close to an equilibrium between the concentrated solvent and the solids within the hopper, so that the fact that a portion of this liquid is used as a carrying medium to convey the solids into the treating chamber H will have very little further effect as to dissolving solubles.

That portion of the concentrated solvent so used will mix in the bottom portion of the chamber H and in the space L with the main body of the solvent, and pass with it back to the hopper A and out.

The action in using a portion of the concentrated solvent as a carrying medium for the solids to be treated is that of temporarily borrowing a portion of the liquid at one point and returning it at another, and as far as the diffusion process is concerned the effect will be little if any under proper conditions, and is an entirely independent operation outside the cycle of diffusion.

Taking the total amount of solvent as 100 if 20 parts of it be continually in use as a carrying medium, the effect will be that 120 parts of solvent will pass through the pipe N and the heaters $T^1$—$T^2$ for each 100 parts of solvent passing through the chamber H, and it will thus assist in carrying greater amounts of heat to the hopper A.

It is obvious that the length of treatment or the degree of exhaustion of the material is dependent upon the height of the chamber H, and that the amount of material which may be treated, or the capacity is dependent upon the diameter of the chamber H.

Further the concentration of the solvent will be proportional to the amount of solvent admitted through the pipe Q, as compared with the amount of the solids to be treated or the soluble matter to be dissolved.

The extent of the packing or the pressure maintained within the chamber H, over and above the hydrostatic pressure of the column will be controlled by the extent of the opening of the valve U, and the position of the adjustable bell S.

This process may be applied to removing soluble matter from material which is of such a nature, that when finely divided to the extent required for the operation of the forces of diffusion or osmosis, the same will not pack so tightly but that there remains uniformly distributed interstitial spaces throughout the mass.

Owing to the manner in which the material is deposited within the treating cylinder it must be necessarily uniformly distributed; and any tendency toward inequality will be automatically corrected by the flow of the conveying liquid. While, therefore, the treating liquid can freely percolate through the mass the constant upward movement of such mass will counteract any tendency toward plugging or channeling.

It will be observed that while the mass of material in the treating cylinder H works gradually upward, the treating or solvent liquid moves downward through such mass, giving rise to the peculiar result that although the material is conveyed by means of a current of liquid, it moves in a direction opposite to the direction of flow of the solvent liquid, thus employing the principle of counter-currents.

Having thus described my invention, what I claim as new and desire to secure by Letters Patent, is:—

1. The herein described process of extracting sugar or other soluble matter from shredded beets or the like material which comprises forming a compressed continuous mass of such material by pressure of supply of the same at the inlet end of a closed container having a restricted outlet, causing such compressed mass to travel continuously in one direction toward said outlet, and continuously forcing treating liquid under pressure above that of the atmosphere through such compressed mass in the opposite direction.

2. The herein described process of extracting sugar or other soluble matter from shredded beets or like material which comprises forming a compressed compact moving mass of such material in an elongated closed container by continuously feeding fresh material into one end of the container and thus crowding exhausted material continuously from a restricted outlet at the other end, and continuously forcing treating liquid under pressure above that of the atmosphere into the discharge end of the container, through the compressed mass of material, and out of the material feeding end.

3. The herein described process of extracting sugar or other soluble matter from shredded beets or like material which comprises forming a compressed compact moving mass of such material in a closed container by continuously feeding a mixture of extracting liquid and fresh material into one end of said container and there separating said liquid from said material, returning said liquid to mix with said fresh incoming material, crowding exhausted material from a restricted outlet at the other end of said container by the pressure of said fresh incoming material, and continuously forcing extracting liquid under pressure above that of the atmosphere into the material discharge end of said container, through the compressed mass of material, and into the return flow of liquid to mix with fresh incoming material.

4. The herein described process of extracting sugar or other soluble matter from shredded beets or like material which comprises forming a compressed compact moving mass of such material in a closed container by continuously feeding a mixture of extracting liquid and fresh material into one end of said container and there separating said liquid from said material, heating said liquid to the sterilizing temperature and returning it to mix with and sterilize fresh incoming material, crowding exhausted material from a restricted outlet at the other end of said container by the pressure of said fresh incoming material, and continuously forcing extracting liquid under pressure above that of the atmosphere into the material discharge end of said container, through the compressed mass of material, and into the return flow of liquid to mix with fresh incoming material.

5. The herein described process of treating shredded beets or like material which comprises causing a current of liquid to flow through a circulating system including a suitable closed container, introducing the material into such system so that it is continuously deposited in the container by the liquid, maintaining the quantity of liquid in circulation substantially constant, and progressively displacing such liquid by continuously introducing fresh liquid under pressure above that of the atmosphere into the circulating system through the mass of deposited material.

6. A process of extracting soluble matter from comminuted material which comprises forming a mixture of a solvent with said material; continuously forcing said mixture through a conduit, whereby the solvent dissolves some of the soluble matter; continually abstracting the said solution from the material and reintroducing a portion of said solution into the conduit to again traverse same and thus convey more of the comminuted material along said conduit; discharging the residue of the comminuted material into another conduit and therein treating it with a counter current of solvent which mixes with the original current of solvent; and continuously discharging a most concentrated solution from said first conduit.

In testimony whereof I affix my signature in presence of two witnesses.

WALTON C. GRAHAM.

Witnesses:
C. W. LUFF,
M. M. GEORGE.

Certificate of Correction.

It is hereby certified that in Letters Patent No. 1,437,801, granted December 5, 1922, upon the application of Walton C. Graham, of Denver, Colorado, for an improvement in "Processes of Extracting Soluble Matters from Shredded or Finely-Divided Materials," an error appears in the printed specification requiring correction as follows: Page 4, line 14, claim 5, before the word "maintaining" insert the words *and there held under compression;* and that the said Letters Patent should be read with this correction therein that the same may conform to the record of the case in the Patent Office.

Signed and sealed this 13th day of March, A. D., 1923.

[SEAL.]
KARL FENNING,
*Acting Commissioner of Patents.*